Patented Mar. 18, 1952

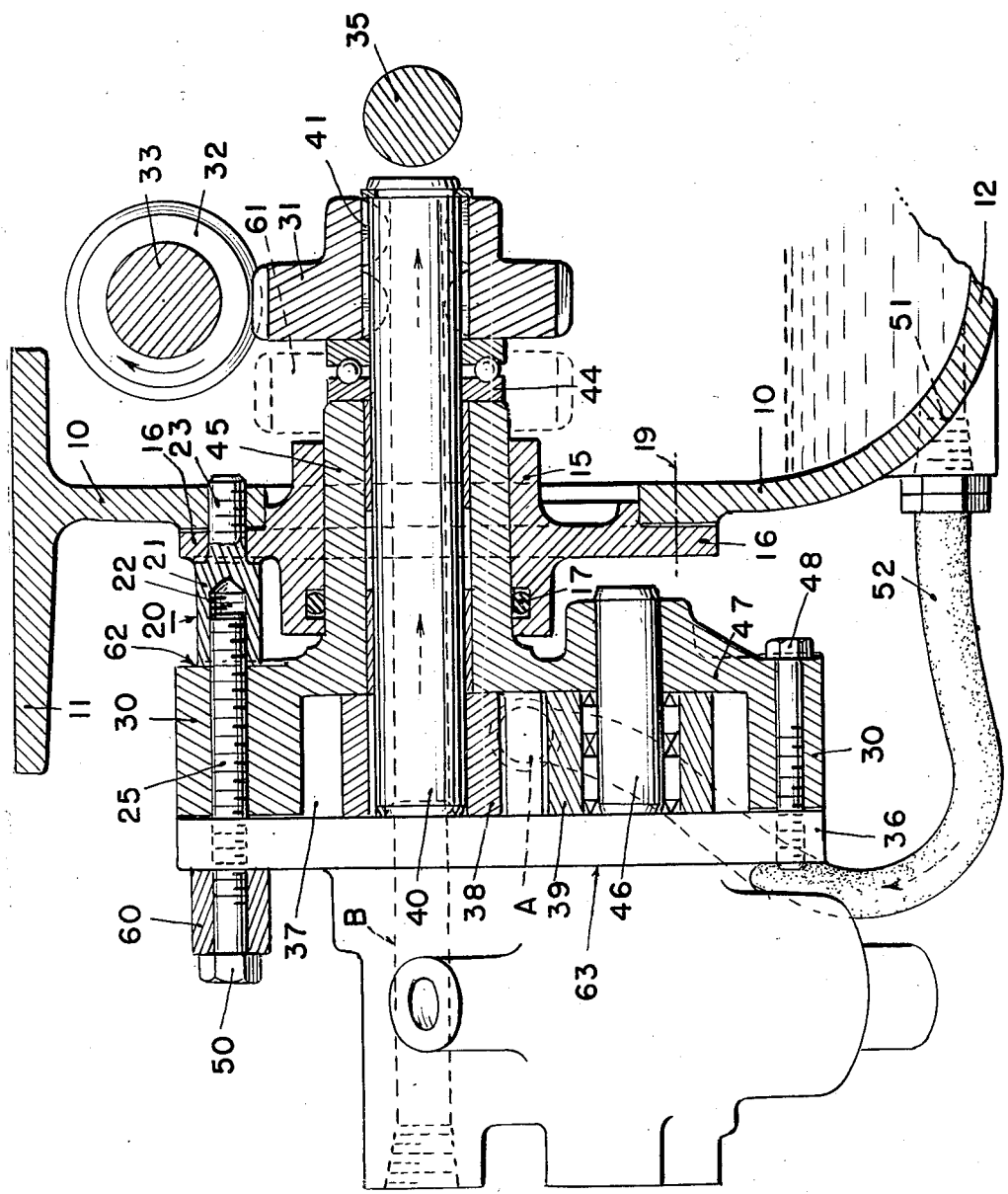

2,589,880

UNITED STATES PATENT OFFICE 2,589,880

INTERMITTENTLY USED POWER TAKE-OFF

Richard H. Sheppard, Hanover, Pa.

Application June 12, 1950, Serial No. 167,621

5 Claims. (Cl. 74—15.6)

This invention relates to power take-offs and has for its principal object the provision of a simple power take-off unit which can be locked in driving position and can be shifted so as to be locked out of driving position by a very simple sliding movement, requiring merely the unscrewing and replacing of a single bolt and the shifting in position of a sleeve carried by this bolt.

The figure shows a vertical section thru the axis of the shaft of the power unit.

The part 10 is a large tractor housing casting having at its top the horizontal beam 11 and having at its bottom the shell or basin 12 which serves as a reservoir for holding the oil which is delivered to the power take-off mechanism here illustrated as a pump and a valve body, the latter determining the path of the pumped oil. This valve is shown in detail in my co-pending application No. 167,622 filed June 12, 1950.

The tractor casting 10 has a large opening in its side which receives a horizontal bearing 15 having a vertical flange 16 and carrying at its outer side an oil ring 17. The central portion of the bearing 15 extends on both sides of the casting 10 and is held in place by a series of bolts indicated by the line 19. One of the bolts of this group is of particular shape and is numbered 20. This member includes a cylindrical portion 21 centrally tapped as at 22 to receive the bolt 25. Integral with the cylindrical body 21 is a smaller threaded portion 23 which passes thru the flange 16 of the bearing 15 and is screwed in the wall of the casting 10 and therefore holds these parts together. The object of the cylindrical portion 21 is to serve as a stop to anchor the pump body 30 in a position so that the pinion 31 is in perfect mesh with the gear 32 mounted on shaft 33 which is constantly rotating when the tractor is in use, member 33 being a shaft in the usual Timken transmission. The main drive shaft 35 of the tractor is shown in cross-section to indicate the vertical center line of the tractor and to orient the parts.

The pump 30 has a recess 37 in which is mounted the oil circulating wheels 38 and 39. Wheel 38 is mounted on a long hollow shaft 40 carrying at its free end the pinion 31 keyed to the shaft as at 41 and abutting a ball thrust bearing 44 which on the other side is in firm contact with the extended boss 45 of the pump body, this boss having contact with the bearing 15 throughout the entire axial length of the bearing. The other pump-wheel 39 is mounted on a short stud 46 which has a pressed fit with the back wall 47 of the pump body 30. The integral base 36 of the valve is at the same time the cover of the pump and this member is secured to the pump body by a plurality of screws one of which is 25 while all of the others, about twelve in all, are of standard type with their heads 48 toward the tractor casting. The head 50 of special screw 25 is on the opposite side for convenience in use as it is removed whenever the power take-off unit is shifted.

In the normal use, as illustrated in the figure, the pump and the valve body have been moved to the right as far as they will go. The pump body is in contact with the cylindrical body or stop 21, the boss 45 of the body is snugly supported in the bearing 15, and the pinion 31 is in mesh with tractor-carried gear 32. Since the latter is constantly turning, the shaft 40 is constantly turning. Oil passes thru the opening 51 at the bottom of the reservoir formed by the shell 12 and passes thru a flexible pipe 52 to a point indicated by the dotted circle A, this being at the far side of the pump as seen in the figure. The gears 38 and 39 drive the oil toward the observer and then to the left, as seen in the figure, and the oil passes thru the valve body in any one of a plurality of paths, the oil returning thru the bore in the valve body indicated at B and thence thru the alined hollow shaft 40 back into the reservoir 12.

As stated, the power take-off which includes the valve and the pump is sometimes not needed for long periods of time and it is convenient to avoid the wear on these parts by shifting the pinion 31 out of mesh with the constantly turning gear 32. In the present invention this is accomplished in an extremely simple manner. Between the head 50 of the bolt 25 and the member 36, which is the base of the valve and the cover of the pump, is located a sleeve 60. The axial length of the sleeve 60 is exactly equal to the desired movement of the valve and pump from inoperative position to a position where the power take-off is in use. When the power unit is to be rendered inoperative, all that is required is to remove the bolt 25 and with it the sleeve 60. The boss 45 of the pump has a quite extended bearing surface and supports the the entire unit without difficulty. With the bolt 25 removed from the cylindrical body 21, the entire unit is shifted to the left in the figure so that the pinion 31 now occupies the position indicated by the dotted lines 61 in which location the pinion 31 is entirely disconnected from the driving gear 32 and the entire power unit is therefore at rest. The sleeve 60 is now placed in position indicated approximately by the numeral 62, that is the sleeve will then touch the end of cylindrical body 21 at the right and will engage the pump body 30 at its other or outer end. The screw 25 is now replaced and its head 50 at this time will be in firm contact with the outer wall 63 of the unit, this being the far surface of the base 36 of the valve body.

What I claim is:

1. The combination with a self-propelled vehicle including a frame having a bearing therein, a member carried by the frame and having therein a tapped recess proximate the bearing, and a driven gear; of a power take-off unit slidable in the bearing including a shaft, an operating pinion on said shaft movable with the shaft into and out of mesh with said driven gear, a housing for the unit having a cylindrical opening therethru which is spaced from and with its axis parallel to the axis of the shaft, a headed and threaded securing means passing loosely thru said opening and fitting into the recess with its head spaced from the frame when the gears are in mesh for driving the unit, a sleeve loose on the securing means and fitting snugly between the housing and the head when the gears are in mesh and the securing means is screwed into the tapped recess to hold the power take-off in operative position, said sleeve being of a length equal to the axial movement of the pinion from operative to inoperative position, whereby the power take-off unit can be shifted from operative or inoperative position and vice versa by the removal of but the one securing means and positioning the sleeve either on the frame side of the housing or on the far side of the housing.

2. The device of claim 1 in which the unit has an extended hollow boss snugly fitting the bearing, whereby the unit may be manually shifted axially in the bearing and the securing means is the sole means for preventing shifting of the unit in the bearing.

3. The device of claim 1 in which the member having the tapped recess is a stud having a threaded portion, the bearing and the main portion of the frame are separate members and the stud is one of a series of bolts securing the bearing to the frame, the opening in the frame when the bearing is removed being greater than the diameter of the pinion, whereby the bearing and the unit with its shaft and pinion may be withdrawn from the frame when the series of bolts is removed.

4. In combination a tractor side frame for reception of a power take-off unit comprising a casting having an opening therethru to receive a power unit with its flanged bearing and pinion assembled, a stud having in one end a threaded portion to pass loosely thru the bearing flange and to have threaded engagement with the casting and on the other end having a tapped recess to receive a bolt holding the unit in place, additional means for securing the bearing flange to the casting, a headed screw passing thru the unit and into the recess, and a sleeve on the screw adapted to be placed between the head and the unit in power take-off operating position or between the stud and the unit in inoperative position.

5. The combination with a tractor having a frame, a gear for driving an intermittently used unit, and a bearing in the frame; of a unit having an extended boss slidable in the bearing and supported thereby, a driven shaft within the unit, a pinion on said shaft movable with the unit to mesh with said driving gear, means having engagement with the frame for preventing sliding movement of the unit in the bearing, said means comprising a headed member, and a sleeve loosely mounted on the headed member and being of a length equal to the amount of sliding of the unit to bring the pinion into and out of mesh with the driving gear, whereby when the sleeve is mounted on the headed member between the unit and the head of the member, the pinion is in mesh and the unit is operated and when the sleeve is on the headed member between the unit and the frame the unit is in inoperative position.

RICHARD H. SHEPPARD.

REFERENCES CITED

The following references are of record in the file of this patent:

UNITED STATES PATENTS

| Number | Name | Date |
| --- | --- | --- |
| 1,460,431 | Muller | July 3, 1923 |
| 1,482,312 | Mason | Jan. 29, 1924 |
| 2,520,005 | Henry | Aug. 22, 1950 |
| 2,526,964 | Muller | Oct. 24, 1950 |